United States Patent Office 2,889,373
Patented June 2, 1959

2,889,373

CALCIUM TRIMETHYLOLPHENATE

Cal Y. Meyers, Princeton, N.J., assignor to Union Carbide Corporation, a corporation of New York No Drawing. Application February 15, 1957
Serial No. 640,350

8 Claims. (Cl. 260—621)

This invention relates to calcium 2,4,6-trimethylolphenate and a method for its preparation.

Alkaline salts of 2,4,6-trimethylolphenol, such as the sodium trimethylolphenate and barium trimethylolphenate are known. Martin, U.S. 2,579,329, has described such a process for producing the sodium and barium salts, by the reaction of phenol, formaldehyde, and the sodium or barium hydroxide. Attempts to make the corresponding calcium, potassium, or strontium salts were, however, unsuccessful. Martin states that only the sodium and barium hydroxides are operable in his invention. The failure of the calcium, strontium, or potassium hydroxides to function as the other two is unexplained other than by conjecture. Martin mentions that his unsuccessful attempts to secure the calcium trimethylolphenate in recoverable form were possibly caused by the presence of mono- and di-methylolphenate salts being present, rendering it impossible to separate out any calcium trimethylolphenate if it actually was present. This inability of the calcium salt to follow the expected scheme of similar materials has also deterred other researchers in this field from preparing the calcium 2,4,6-trimethylolphenate, although Martin has theoretized that it could exist. Heretofore, calcium trimethylolphenate could not be prepared, and to my knowledge has not been prepared in isolable and usable form.

It is therefore an object of the present invention to provide as a new composition of matter substantially pure calcium 2,4,6-trimethylolphenate, which is produced in high yields substantially free of the mono- and dimethylolphenate salts.

I have now prepared the calcium 2,4,6-trimethylolphenate in high yields and excellent purity by a carefully controlled methylolation reaction wherein formaldehyde is employed in amounts of at least stoichiometric amounts with calcium phenate which is substantially free of free phenol. In order to isolate the calcium 2,4,6-trimethylolphenate in pure form, I have found that the methylolation reaction must be conducted in the manner to be herein described. Without such conditions as employed and set forth as part of my invention and discovery, the difficulties experienced by Martin and others will be encountered and no calcium trimethylolphenate will be recovered. Not only is it likely that mono- and di-methylolphenate salts will be formed, making the recovery of the calcium trimethylolphenate impossible as Martin postulated, but also it is highly likely that resinous and high molecular weight by-products will be formed which further complicates or makes impossible product recovery.

In one manner of producing the calcium trimethylolphenate of this invention, calcium phenate substantially free of free phenol is reacted with at least stoichiometric amounts of formaldehyde at temperatures less than 65° C. and preferably less than 45° C. The methylolation must be conducted substantially free of excess phenol in order to prevent the difficulties above mentioned.

Contrary to all expectations, I have found it possible to prepare the calcium phenate in situ from phenol and calcium oxide or hydroxide. I have found that under the conditions of this process the rate of phenation is considerably more rapid than the rate of methylolation such that formaldehyde can be present during the calcium phenate formation. In addition I have found that little if any of the mono- and di-methylolphenate salts are formed in my process, which otherwise would inhibit the isolation and recovery of the calcium trimethylolphenate. In my manner of producing the product, it is preferred that the calcium oxide or hydroxide be added to the phenol first while maintaining the mixture at a temperature of less than about 30° C., and when there is substantially no free phenol remaining in the mixture, conducting the methylolation reaction by the addition of at least six moles of formaldehyde per mole of calcium phenate. As an alternative, mixtures of phenol and formaldehyde can be added to the calcium oxide or hydroxide and similar conditions maintained.

In forming the calcium phenate in this method, fresh reagent grade lime of high purity has been found to be preferred for use. Calcium hydroxide is likewise highly satisfactory. Lime which has been exposed to carbon dioxide or which is partially contaminated with calcium carbonate is also suitable for use in this process providing the amount of such lime is necessarily adjusted to the content of calcium oxide or hydroxide. While calcium carbonate per se does not interfere with the calcium phenate formation or the methylolation reaction and is unreactive with phenol under these conditions, its presence in the calcium compound can, if disregarded, result in excess phenol present in the reaction during methylolation. It is also preferred that no excess calcium oxide or hydroxide be present during the methylolation to prevent undesirable condensation and by-product formation. Likewise, it is undesirable that water-insoluble impurities, particularly calcium carbonate, be present in the reaction mixture after methylolation. The presence of such materials complicates recovery of the crystalline calcium trimethylolphenate. Filtration of the methylolated mixture conveniently removes these impurities.

The formaldehyde employed in the preparation can be in the anhydrous form as in pure formaldehyde or paraformaldehyde, or in the aqueous form, such as in formalin, or in mixtures thereof. It is critical in this process that the formaldehyde be present in amounts of at least stoichiometric amounts, i.e., three moles per equivalent of calcium phenate, and preferably in a slight excess. Best results are secured using three to about four or more moles of formaldehyde per equivalent of calcium phenate. The use of at least stoichiometric amounts of formaldehyde in the methylolation reaction is necessarily critical since the calcium phenate and the mono- and di-methylolphenol products have such similar properties as to be unisolable from the calcium trimethylolphenate.

The presence of water in the methylolation reaction mixture is not highly critical. Water may be present in the formaldehyde or calcium compound or in the phenol. However, large amounts of water are not desirable when separating out the calcium trimethylolphenate. Such water can complicate the recovery and make it necessary to use large amounts of precipitating agents.

The methylolation reaction to produce the calcium trimethylolphenate is effected at temperatures of about 20° C. up to about 65° C.–70° C. Preferably, temperatures of between 25° C. and 55° C. are employed. Temperatures much above 65° C., I have found, favor the formation of high molecular weight resinous by-products, not only seriously decreasing the yield of the calcium trimethylolphenate, but also making it extremely difficult to recover any of the product in usable form. Within the temperature range of about 55° C. to about 65° C. or above, the presence of any free phenol is particularly critical in the methylolation reaction. While it is possible to secure the calcium trimethylolphenate in isolable form when a minor amount of free phenol is present within the preferred temperature range, a high degree of care should be exercised at these higher temperatures to make positive the absence of free phenol. Thus, resins and phenol condensation products will not be formed which would otherwise prevent or impair the recovery of the calcium trimethylolphenate. Temperatures below 25° C. are not particularly preferred since the rate of methylolation is substantially reduced and extended reaction times are required.

Reaction times of about 5 to 25 hours are generally sufficient to complete the methylolation at temperatures within the preferred limits, although shorter or longer times can be employed. To prevent the difficulties created by the presence of mono- and di-methylolphenate compounds, the methylolation reaction should be substantially complete before recovery of the product is attempted.

After the methylolation reaction is completed, it is desirable in my process to remove any water-insoluble materials from the mixtures, for instance by filtration. This step facilitates the ready crystallization and recovery of the calcium trimethylolphenate in high purity. If desired, the calcium trimethylolphenate does not have to be crystallized from the reaction solution but can be employed as an uncrystallized solution for the direct preparation of trimethylolphenol. When further use of the calcium trimethylolphenate solution is contemplated, it is particularly desirable to have little or no unreacted formaldehyde present. This can be accommodated by using about stoichiometric amounts of formaldehyde in the methylolation.

The calcium trimethylolphenate can be recovered in crystalline form from the reaction mixture by the use of precipitation agents or by evaporation in vacuo. Low molecular weight water-soluble solvents in which the calcium trimethylolphenate is substantially insoluble will effectively serve as the precipitating agent. For instance, low molecular weight aliphatic alcohols, as methanol, ethanol, and isopropanol, ketones, such as acetone, and methyl ethyl ketone, low molecular weight aliphatic glycol and alkylene glycol diethers such as ethylene glycol, diethylene glycol, ethylene glycol diethyl ether, diethylene glycol diethyl ether, ethylene glycol dibutyl ether, and the like, cyclic ethers, such as dioxane and morpholine and alkylene polyamines can be employed. After precipitation, the calcium trimethylolphenate can be isolated by filtration, centrifugation, or decantation, and if desired, washed with the precipitating agent. Isopropyl alcohol and acetone and mixtures thereof are the preferred water-soluble precipitating solvents by virtue of their low solubility for the calcium trimethylolphenate, their low cost, availability, and ease of removal.

The crystalline calcium trimethylolphenate produced by this method will generally have a purity of at least 95 percent and more commonly, about 100 percent pure. Generally, no purification of the crystalline material is necessary, however, if only minor amounts of contaminants are present, the crystalline product can be further purified by dissolving in water followed by reprecipitation, or by recrystallization operations and drying the product.

The crystalline calcium trimethylolphenate is characterized by being highly soluble in water, slightly soluble in methanol, and ethanol, and nearly insoluble in acetone, isopropyl alcohol, and non-polar solvents. It has a theoretical neutralization equivalent of 203. As produced in this process, the neutralization equivalent will generally be between about 203 to 206, but can range between 195 and 210.

Calcium trimethylphenate in either the crystalline form or in aqueous solutions, can be used in the preparation of trimethylolphenol ethers in a manner similar to the use of the sodium or barium trimethylolphenates. The calcium trimethylolphenate can also be neutralized to the highly reactive 2,4,6-trimethylolphenol as illustrated below.

The following examples illustrate my invention.

*Example 1*

A mixture consisting of 188 grams (2 moles) of phenol, 324 grams (4 moles) of an aqueous solution containing 37 percent by weight of formaldehyde, and 90 grams (3 moles) of paraformaldehyde was mixed at 15° C. while being cooled in an ice bath. Fifty-six grams (1 mole) of reagent grade lime (99.9 percent CaO by assay) were added to the mixture with vigorous agitation at such a rate that the temperature of the mixture remained below 35° C. The mixture was agitated for two hours and 200 ml. of water was added. The ice bath was removed and agitation was continued for an additional 14 hours during which period the temperature of the mixture remained at from 25° C. to 30° C. without external cooling. The reaction mixture was poured slowly into 2.5 liters of a vigorously agitated solution of acetone and isopropanol (containing two volumes of acetone per volume of isopropanol). A white precipitate formed and was allowed to settle for two hours. The precipitate was collected on a Buchner funnel and the solvents were completely expressed therefrom by means of a rubber dam. The precipitate was then placed in a vacuum desiccator for 24 hours over sodium hydroxide pellets and paraffin at room temperature. There were so obtained 362 grams (89 percent yield) of a fine, white powder, identified as calcium trimethylolphenate.

The calcium trimethylolphenate was readily soluble in water, slightly soluble in methanol and ethanol, very slightly soluble in isopropanol and insoluble in acetone. The powder had a neutralization equivalent of 204 (average of four determinations) as determined by titration with hydrochloric acid to a bromphenol blue endpoint. The calculated neutralization equivalent of calcium trimethylolphenate is 203.

*Example 2*

A mixture consisting of 940 grams (10 moles) phenol, 450 grams (15 moles) paraformaldehyde and 1215 grams (15 moles) of 37 percent by weight aqueous formaldehyde was formed while being cooled to 10° C-15° C. in an ice bath. To the agitated mixture were added 280 grams (5 moles) of reagent grade calcium oxide (99.9 percent CaO by assay) at a rate such that the temperature of the mixture did not exceed 30° C. Agitation was continued for two hours. Five hundred milliters of water were added and the mixture agitated 15 more hours at room temperature. A clear and homogenous aqueous solution of calcium trimethylolphenate formed and was cooled to 0° C.

The product was identified as calcium trimethylolphenate by preparing trimethylolphenol and sodium trimethylolphenate from that. The solution prepared above was neutralized by slowly adding thereto a solution consisting of 490 grams (5 moles) of $H_2SO_4$ dissolved in 500 milliliters of water. The temperature of the reaction mixture so formed was maintained at from 10° C. to 20° C. during the addition. The pH at this point was 5-6. Calcium sulfate precipitated from the reaction mixture and was filtered off and washed with water. The filtrate and wash water were combined and concentrated at a pressure of 5-10 mm. Hg at room temperature. Two thousand one hundred twenty-five grams of an amber colored, moderately viscous solution were obtained. The viscous solution containing about 25 percent by weight of water as determined by a Karl Fischer titration and about 75 percent by weight of trimethylolphenol which was determined by the following analysis.

A five gram sample of the viscous solution was brought to pH 10 by the careful addition of 50 percent by weight aqueos sodium hydroxide solution. To the solution so formed were added, with agitation, 10 milliliters of methanol, then 30 milliliters of isopropyl alcohol, then 100 milliliters of acetone. A white precipitate was formed and was collected. The precipitate was washed with acetone and dried for one hour at room temperature in a vacuum desiccator over paraffin and sodium hydroxide pellets. The dried precipitate contained 8.0 percent water by weight, as determined by a Karl Fischer titration, and had a neutralization equivalent, as determined by three titrations, with 0.1 N HCl to a bromophenol blue endpoint of 226. As calculated, sodium trimethylolphenate monohydrate contains 8.0 percent of water by weight and has a neutralization equivalent of 224.

I claim:

1. Crystalline calcium 2,4,6-trimethylolphenate.

2. Crystalline calcium 2,4,6-trimethylolphenate substantially free of calcium mono- and di-methylolphenate compounds being characterized by being soluble in water, insoluble in acetone, and having a neutralization equivalent of between about 195 and 210.

3. The calcium salt of 2,4,6-trimethylolphenol being substantially free of calcium mono- and di-methylolphenate compounds and recoverable in isolable crystalline form in a purity of at least about 95 percent.

4. An aqueous solution consisting essentially of water and calcium 2,4,6-trimethylolphenate substantially free of calcium mono- and dimethylolphenate compounds.

5. An aqueous solution consisting essentially of water and calcium 2,4,6-trimethylolphenate substantially free of calcium mono- and dimethylolphenate compounds, said calcium 2,4,6-trimethylolphenate having a neutralization equivalent between about 195 and 210.

6. A method for the preparation of calcium 2,4,6-trimethylolphenate substantially free of calcium mono- and dimethylolphenate compounds, and recoverable in isolable crystalline form which includes the steps of reacting a mixture of phenol, formaldehyde, and a calcium compound selected from the group consisting of calcium oxide and calcium hydroxide at a temperature not above about 30° C. until there is substantially no free phenol in the reaction mixture, then heating said phenol free mixture to a temperature between about 20° C. to about 70° C. until methylolation is substantially complete, said phenol being present in a ratio of about two moles per mole of the calcium compound, and said formaldehyde being present in amounts of at least three moles per mole of phenol.

7. A method for the preparation of crystalline calcium trimethylolphenate substantially free of calcium mono- and dimethylolphenate compounds, and recoverable in isolable crystalline form which includes the steps of reacting a mixture of phenol, formaldehyde, and a calcium compound selected from the group consisting of calcium oxide and calcium hydroxide, at a temperature not above about 30° C. until there is substantially no free phenol in the mixture, then reacting the mixture at a temperature between about 25° C. and 55° C. until methylolation is substantially complete, said mixture containing two moles of phenol per mole of said calcium compound and between three and four moles of formaldehyde per mole of phenol, and recovering the calcium 2,4,6-trimethylolphenate thus produced.

8. A method for the preparation of crystalline calcium trimethylolphenate which includes the steps of reacting a mixture of phenol, formaldehyde, and a calcium compound selected from the group consisting of calcium oxide and calcium hydroxide, at a temperature between about 25° C. and 55° C. until methylolation is substantially complete, said mixture containing no more than two moles of phenol per mole of said calcium compound and between three and four moles of formaldehyde per mole of phenol, and recovering the calcium 2,4,6-trimethylolphenate thus produced by the addition of precipitating amounts of a water-soluble organic non-solvent for the calcium trimethylolphenate.

References Cited in the file of this patent

UNITED STATES PATENTS 2,579,329    Martin    Dec. 18, 1951